United States Patent [19]

Tajima et al.

[11] Patent Number: 4,757,736

[45] Date of Patent: Jul. 19, 1988

[54] ELECTRONIC MUSICAL INSTRUMENT HAVING RHYTHM-PLAY FUNCTION BASED ON MANUAL OPERATION

[75] Inventors: Yoichiro Tajima; Hideo Yamaya, both of Tokyo; Tomohisa Ishikawa, Kawagoe, all of Japan

[73] Assignee: Casio Computer Co., Ltd., Tokyo, Japan

[21] Appl. No.: 915,710

[22] Filed: Oct. 6, 1986

[30] Foreign Application Priority Data

Oct. 15, 1985 [JP] Japan ........................ 60-227812
Nov. 27, 1985 [JP] Japan ........................ 60-266999
Dec. 16, 1985 [JP] Japan ........................ 60-282574

[51] Int. Cl.[4] ..................... G10H 1/06; G10H 1/40; G09B 1/04

[52] U.S. Cl. ..................... 84/1.03; 84/1.11; 84/477 R; 84/478; 84/DIG. 12

[58] Field of Search ............... 84/1.03, 1.04, DIG. 12, 84/1.01, 1.05–1.13, 1.19–1.23, 477 R, 478

[56] References Cited

U.S. PATENT DOCUMENTS 3,433,880 3/1969 Southard ..................... 84/DIG. 12
4,418,598 12/1983 Klynas ..................... 84/DIG. 12
4,479,412 10/1984 Klynas .
4,635,519 1/1987 Sakurai ..................... 84/1.03

FOREIGN PATENT DOCUMENTS 52-114728 8/1977 Japan .

*Primary Examiner*—S. J. Witkowski
*Attorney, Agent, or Firm*—Frishauf, Holtz, Goodman & Woodward

[57] ABSTRACT

A plurality of pad operating means for manual operation are provided on a keyboard panel of an electronic keyboard musical instrument. When an operator operates the pad operating means using the keyboard during melody play, an operation signal is supplied to a CPU, and a rhythm sound corresponding to the operated pad is generated under control of the CPU.

29 Claims, 15 Drawing Sheets

ELECTRONIC MUSICAL INSTRUMENT HAVING RHYTHM-PLAY FUNCTION BASED ON MANUAL OPERATION

BACKGROUND OF THE INVENTION

This invention relates to an electronic musical instrument with a rhythm-play function for providing rhythm play by generating, in particular, percussion instrument sounds.

Heretofore, various electronic keyboard musical instruments capable of automatic rhythm play have been developed. In such musical instruments, automatic rhythm play of waltz, rock, tango, etc., can be obtained by operation of a rhythm-selection switch. In this type of prior art musical instrument, however, rhythm sounds which can be generated are usually generated repeatedly in a particular pattern, so that the play is inevitably rather monotonous.

This type of electronic keyboard musical instrument further has a so-called fill-in function for interrupting previous rhythm play and permitting ad-lib-like rhythm play, in response to the operation of a particular push-button switch. Such fill-in rhythm is usually generated according to data stored in a ROM which is preliminarily programmed by the manufacturer, so that, musically, it is not so interesting.

Accordingly, it is expected that more realistic rhythm play can be achieved by generating rhythm sounds by manual operation. In a prior art electronic percussion instrument called an electronic drum, however, it is only possible to generate percussion sounds by operating an operating section called a pad or the like, and no consideration is given in relation to such electronic percussion instruments to the operation of a keyboard having white and black keys. Electronic percussion instruments of the type noted above are disclosed in U.S. Pat. No. 4,418,598 (issued on Dec. 6, 1983) and U.S. Pat. No. 4,479,412 (issued on Oct. 30, 1984).

Further, there are electronic keyboard musical instruments which permit generation of such percussion instrument sounds, as mentioned above, in response to operation of the keyboard. For example, Japanese Utility Model Laid-Open No. 52-114728 discloses a technique in which a key can assume a mode for instructing generation of a melody sound and a mode for instructing the generation of a percussion instrument sound, in response to the operation of a switch. Again, in this case, however, there is no musical relation between the playing of melody sounds in response to keyboard operation and generation of rhythm sounds.

SUMMARY OF THE INVENTION

The object of the invention is to provide an electronic musical instrument which can generate rhythm sounds of percussion instruments or the like, in response to manual operation, and which permits this playing of rhythm sounds, in a timed relation to melody playing or accompaniment playing.

According to the invention, there is provided an electronic keyboard musical instrument capable of manual rhythm play, comprising:

a keyboard having a plurality of keys for instructing the generation of a note tone when a corresponding key is operated;

tone-signal generating means for generating a tone signal according to a tone-signal generation instruction from said keyboard;

operating means provided in a casing with the keyboard provided thereon, the operating means being discrete from the keyboard and manually operable;

control means for detecting the operation of the operating means and instructing the generation of a rhythm sound whenever operation is detected; and rhythm-sound signal generating means for generating a rhythm sound signal according to an instruction of the control means.

DETAILED DESCRIPTION OF THE PREFERRED EMBODIMENT

(First Embodiment)

Now, a first embodiment of the invention will be described, with reference to FIGS. 1 to 10.

Figure 1:
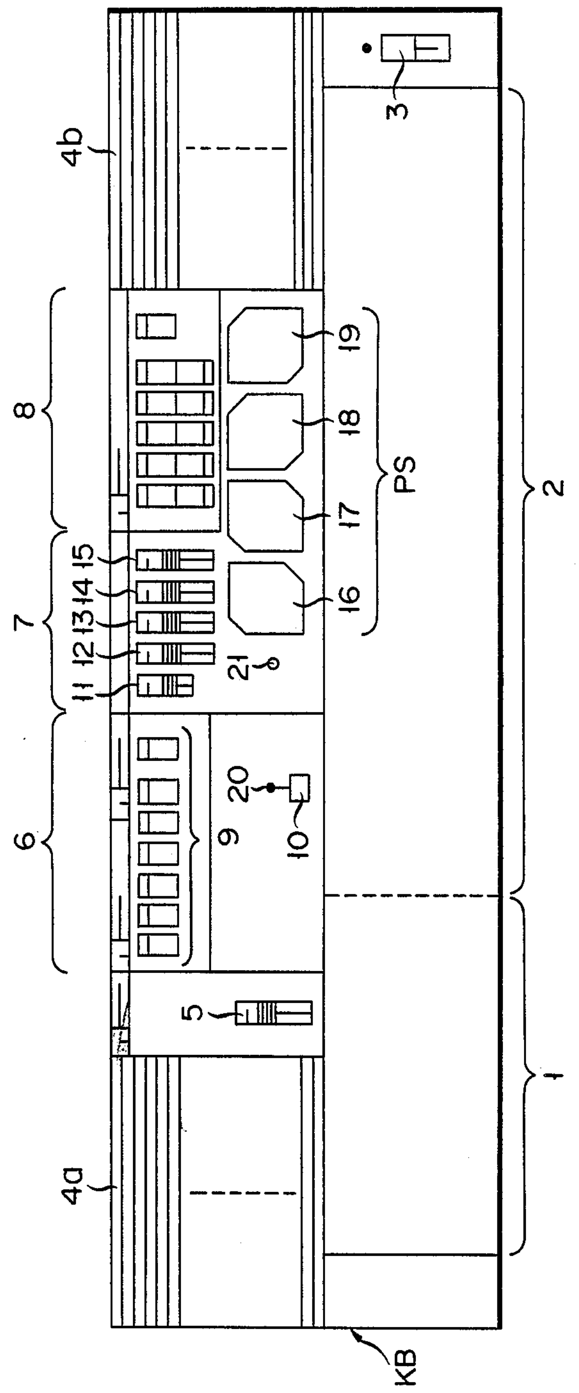
FIG. 1 is a plan view showing a first embodiment of the invention applied to an electronic keyboard musical instrument.

FIG. 1 is a plan view showing an electronic keyboard musical instrument. The front side of the casing of the instrument is provided with accompaniment keyboard 1 and melody keyboard 2. A power switch 3 is provided at that end of the instrument casing adjacent to melody keyboard 2. Loudspeakers **4*a* and 4*b* are provided on accompaniment keyboard 1 and melody keyboard 2, adjacent thereto. Accompaniment mode lever 5, automatic rhythm operating section 6, pad rhythm operating section 7, and melody timbre selection key 8 are provided between loudspeakers 4***a* and 4*b*. Accompaniment mode lever 5 is for switching modes including: a one-finger mode, in which chord play is performed on accompaniment keyboard 1, using one finger; a finger mode, in which chords are automatically played by depressing chord positions; and a normal mode, in which accompaniment keyboard 1 is used, not for accompaniment, but for ordinary melody play. Automatic rhythm section 6 is provided with rhythm selection keys 9 for automatic play of rhythms such as rock, disco, etc., and rhythm start/stop key 10 for starting and stopping automatic rhythm play.

Figure 2:
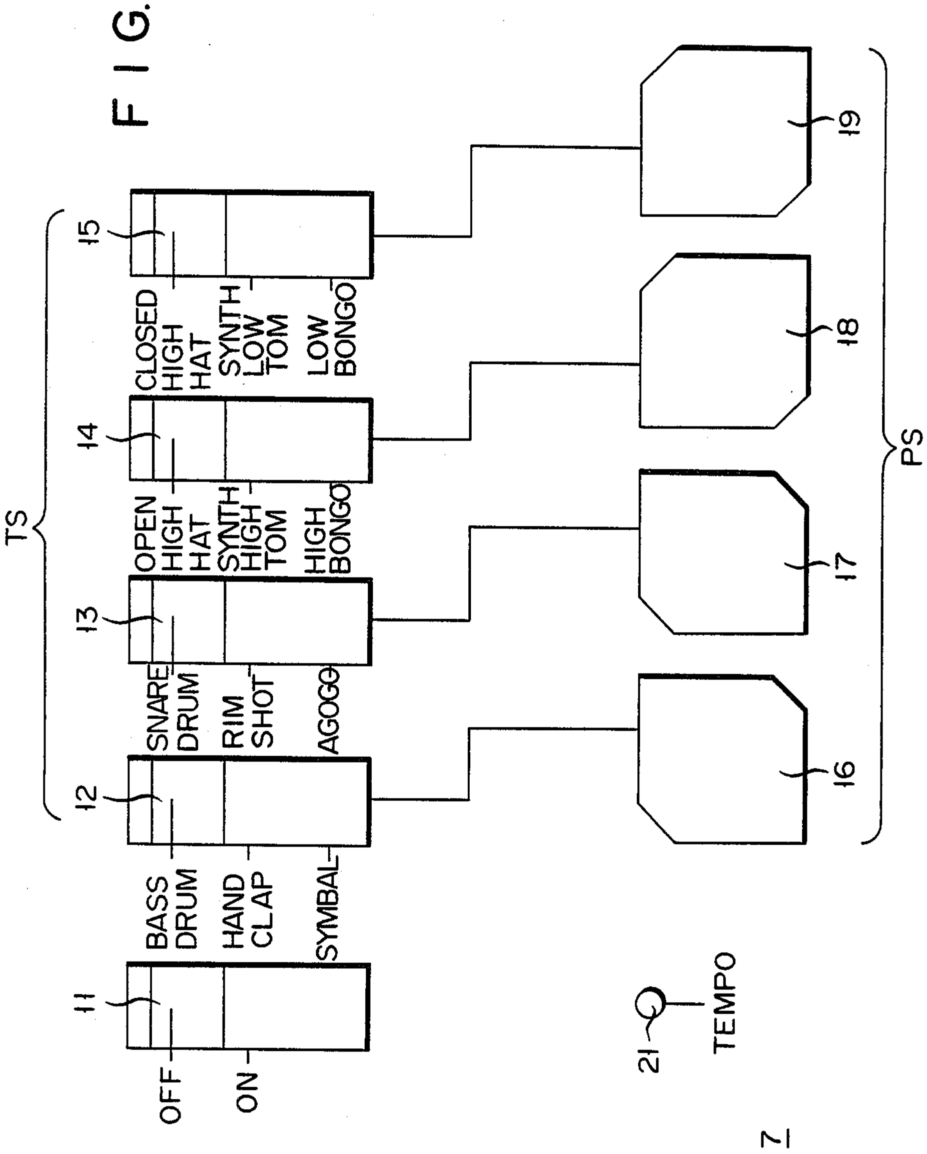
FIG. 2 is a schematic view, to an enlarged scale, showing a pad-rhythm operating section shown in FIG. 1.

Pad rhythm operating section 7, as is shown in FIG. 2, includes bass drum pattern key 11, pad timbre selection keys 12 to 15, and pad keys 16 to 19. When any one of pad keys 16 to 19 are operated, a corresponding single attenuating sound of a percussion instrument is produced. Pad timbre selection keys 12 to 15 serve to switch the timbre of an attenuating sound of the pad keys to bass drum, low bongo, etc. Bass drum pattern key 11 serves to provide automatic rhythm play of bass drum sound, which is the most fundamental rhythm, even during the sounding of an attenuating tone of a pad key. Bar LED 20, shown in FIG. 1, is turned on at the start of each bar, to indicate the bar start. Time LED 21 is turned on at the start of each time, to display the rhythm tempo during pad rhythm performance.

Melody timbre selection key 8 serves to selectively designate the timbre of a melody played with melody keyboard 2 and accompaniment keyboard 1.

The circuit construction of the embodiment will now be described.

Figure 3:
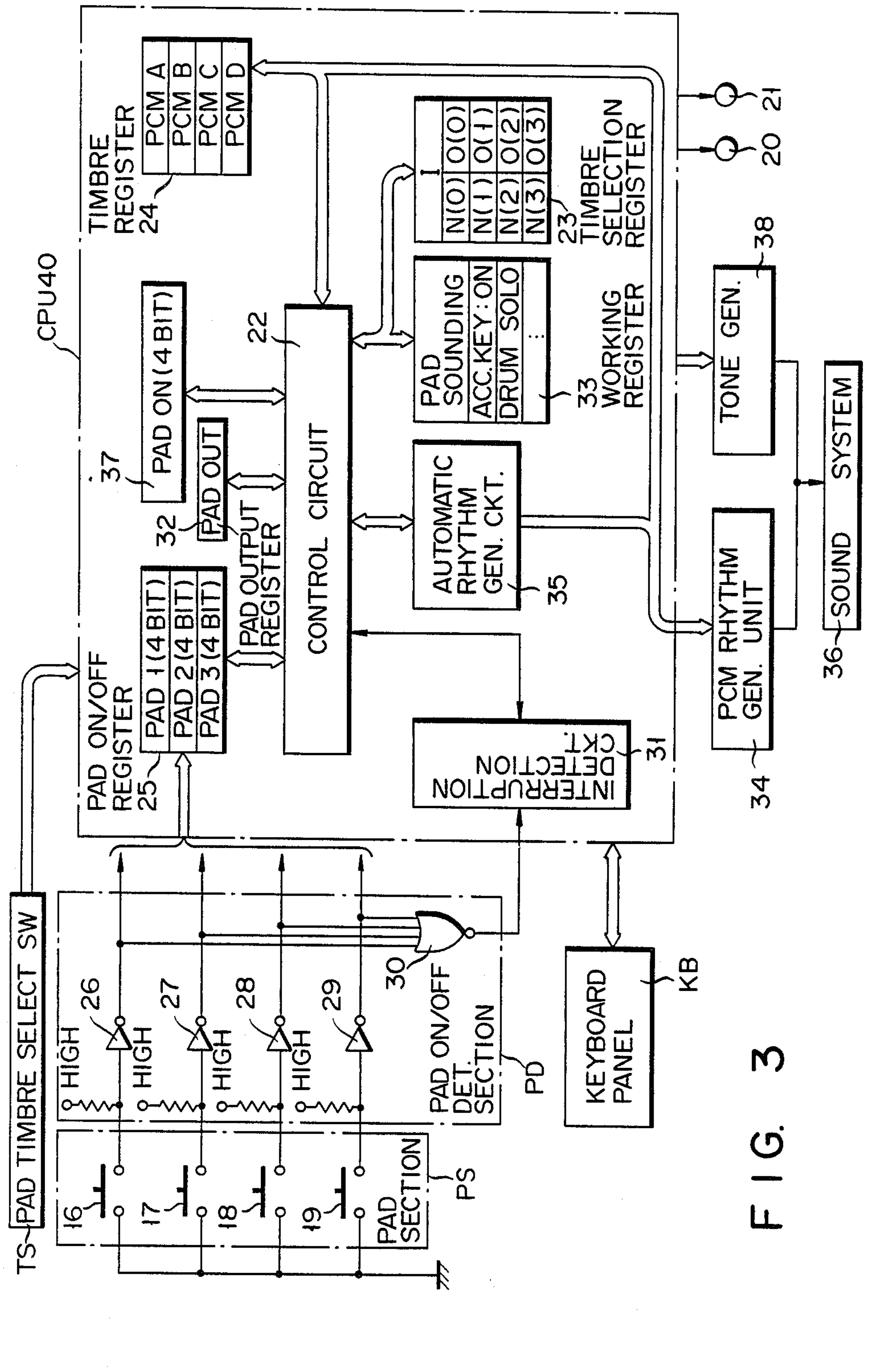
FIG. 3 is a block diagram showing the circuitry of the first embodiment.

Referring to FIG. 3, control circuit 22 scans and judges the state of timbre selection keys 12 to 15 in timbre selection switch TS. It provides timbre data which is preset in four N (I) (I=0 to 3) registers of timbre selection register 23 in CPU 40 and compares it with the timbres which have been preset in four O (I) (I=0 to 3) registers, during the previous scan. When a change is detected, control circuit 22 presets new timbre data in corresponding areas of timbre register 24. Timbre selection register 23 also includes an I flag register for selectively designating the four N (I) and four O (I) registers.

Pad switches 16 to 19 provided in pad section PS, each have one end grounded and the other end connected, via resistors, to a high-level potential terminal in pad on/off detection section PD. When each of pad keys 16 to 19 is turned on, the potential at its other end, noted above, is turned to low level. This low-level potential is inverted through each of inverters 26 to 29, to be fed as a low-level interruption-detection signal, via NOR gate 30, to interruption-detection circuit 31 of CPU 40, to be stored therein. This signal is detected by control circuit 22 every 2 msec. When an interruption-detection signal is detected by control circuit 22, 4-bit pad-on/off data from inverters 26 to 29 is preset in the PAD 1 register of pad-on/off register 25, pad-on/off data in PAD 1 is transferred to PAD 2, and pad-on/off data in PAD 2 is transferred to PAD 3. When pad-on/off data in PAD 1 first becomes "1" with respect to the preceding pad-on/off data in PAD 2 and pad-on/off data in PAD 3, it is determined that there has been a turn-on at one of pad keys 16 to 19. As a result, pad-on/off data in PAD 3 is preset in pad output register 32. At the same time, a pad-sounding flag is set in working register 33. Timbre data corresponding to that one of pad keys 16 to 19 which is judged to be turned on is read out from timbre register 24 and fed to PCM rhythm generation unit 34, to produce a rhythm sound signal. In this way, an attenuating sound is generated from sounding system 36. During automatic rhythm play, rhythm pattern data from automatic rhythm generation control circuit 35 is fed to PCM rhythm generation unit 34, while accompaniment pattern data corresponding to the rhythm pattern data is fed to musical tone generation unit 38, whereby rhythm sounds and accompaniment sounds are generated.

When one of pad keys 16 to 19 is turned on, a drum solo flag in working register 33 is set, and automatic rhythm play is stopped. If bass drum pattern key 11 has been turned on at this time, only the bass drum, which represents the most basic rhythm, is continually sounded. When accompaniment keyboard 1 is operated subsequent to the rhythm play of one or more pad keys 16 to 19, the pad attenuating sound and bass drum sound are stopped, and automatic rhythm play is restarted. If the operation on accompaniment keyboard 1 is started in the last time, i.e., the fourth time in a bar, the stopping of the pad attenuating sound is postponed until the first time of the next bar. At this time, control circuit 22 sets "on" the flag of an accompaniment key in working register 33, whereby a waiting process is executed. While the pad attenuating sound is being provided, time LED 21 is turned on at the start of each time according to the tempo speed, thus showing the tempo of the music play.

When data "1" is set in pad output register 32, with one of pad keys 16 to 19 turned on, data "1" is also set in chattering-removal flag register 37, and pad output register 32 is cleared. After the lapse of 30 msec. of waiting time, a chattering process is executed so that the same pad attenuating sound is not generated. Further, CPU 40 feeds a key-code data, corresponding to an operated key on melody keyboard 2, to tone generator 38 which generates a musical tone to be sounded from sound system 36.

Now, the operation of the embodiment will be described.

Pad Timbre-Setting Process

Figure 4:
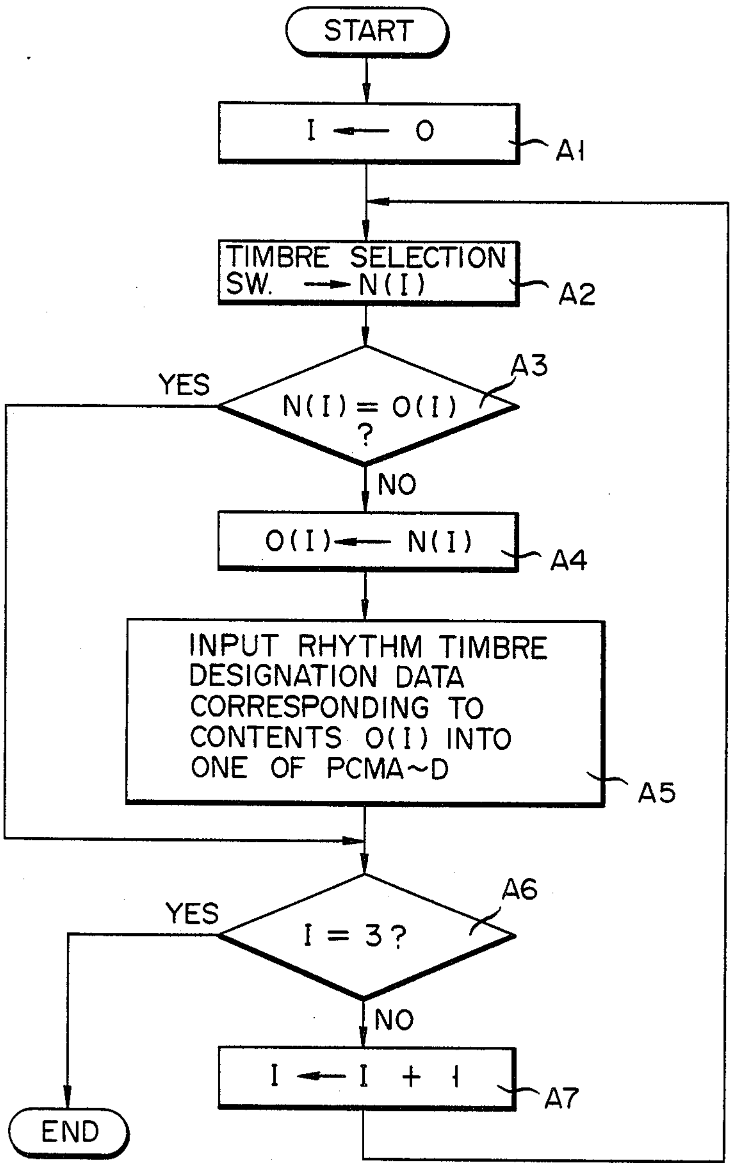
FIG. 4 is a flow chart showing a pad timbre-setting process as an operation of the first embodiment.

Initialization is executed when the power switch 3 is turned on. At this time, timbre selection register 23, timbre register 24, pad-on/off register 25, working register 33, pad output register 32 and chattering-removal flag register 37 have been cleared. When bass drum pattern key 11 is turned on, handclap is set by pad timbre selection switch 12, snare drum is set by pad timbre selection switch 13, open highhat is set by pad timbre selection key 14, and closed highhat is set by pad timbre selection switch 15. CPU 40 starts a pad timbre designation process, as shown in FIG. 4. More specifically, CPU 40 sets "0" as I flag in timbre selection register 23 (step A1). Timbre data of handclap of pad timbre selection switch 12 is preset in N (0) register designated by I=0 (step A2). CPU 40 checks whether the preset data coincides with previous timbre data of O (0), in step A3. Since O (0) remains cleared, both timbre data do not coincide, so that CPU 40 transfers handclap tone in N (0) (step A4) to timbre data register of O (0) which is then transferred to PCMA in timbre register 24 (step A5).

Thus, a timbre of pad attenuating sound can be selected from among a plurality of timbres.

Then, since the I flag is not "3", CPU 40 executes a check as to whether timbre-setting has been completed with respect to all pad timbre selection switches 12 to 15 (step A6). Then, it increments the I flag by "1" (step A7). CPU 40 executes a similar pad timbre-setting process with respect to pad timbre selection key 13 with which the next snear drum is designated. When the pad timbre-setting process has been completed with respect to pad timbre selection key 14 with which open highhat is designated and pad timbre selection key 15 with which closed highhat is designated, I is now I=3, so that CPU 40 ends this process.

When pad timbre selection switch 15 is subsequently switched to low bongo, for instance, timbre data of low bongo is preset in an N (0) register, and timbre data of closed highhat in an O (0) register. CPU 40 determines, in step A3, that the two timbre data do not coincide, and a pad timbre-setting process for low bongo is executed (steps A4 and A5).

In this way, it is possible to provide various timbres for the pad attenuating sound.

Pad Key-On Detection Process

When a desired rhythm is selected by operating rhythm selection key 9, and rhythm start/stop key 10 is turned on, rhythm play is automatically started, so that bar LED 20 is turned on at the start of each bar. In timed relation to this, the player may produce a melody, using melody keyboard 2 and an accompaniment, using accompaniment keyboard 1.

Figure 5:
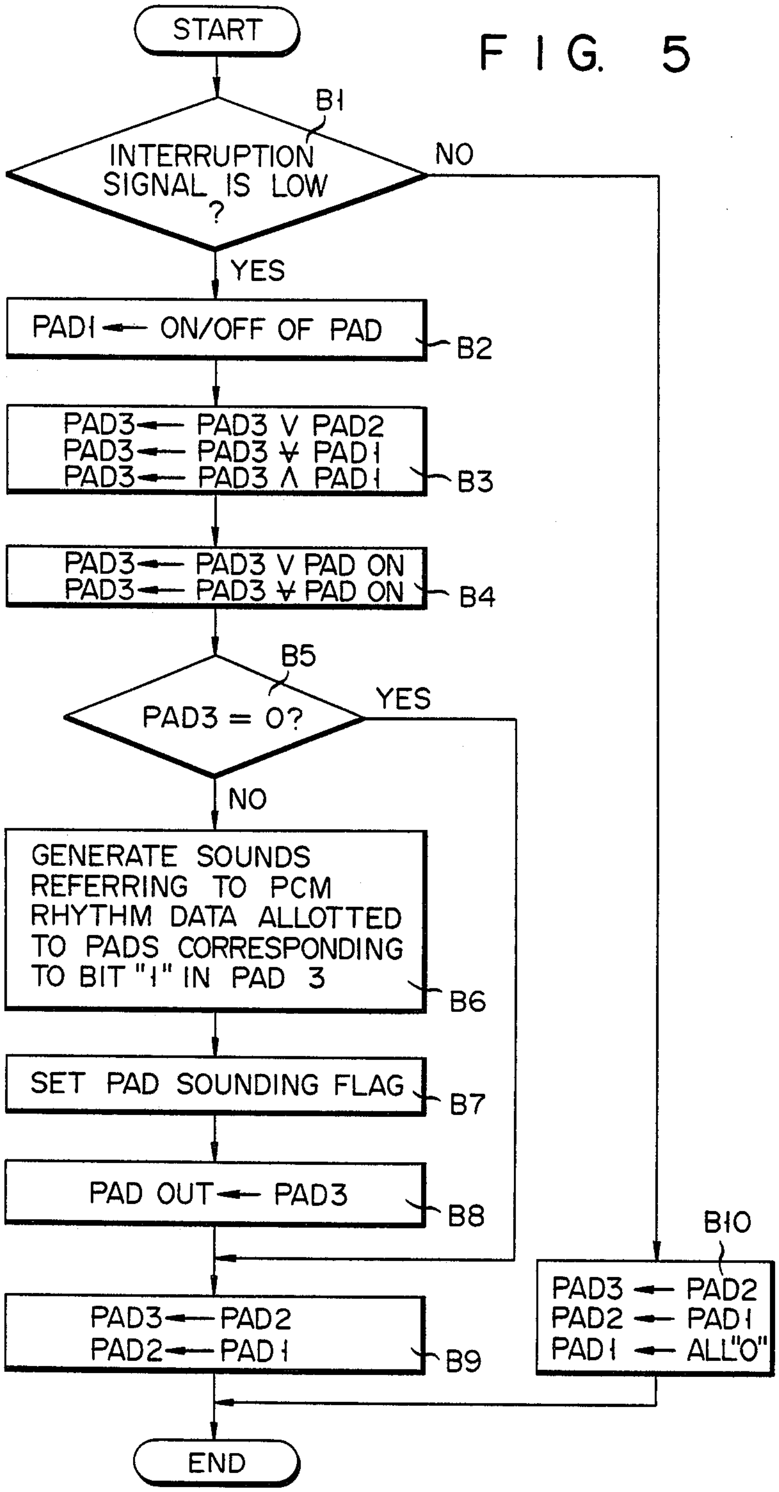
FIG. 5 is a flow chart showing a pad key-on detection process of the first embodiment.
Figure 6:
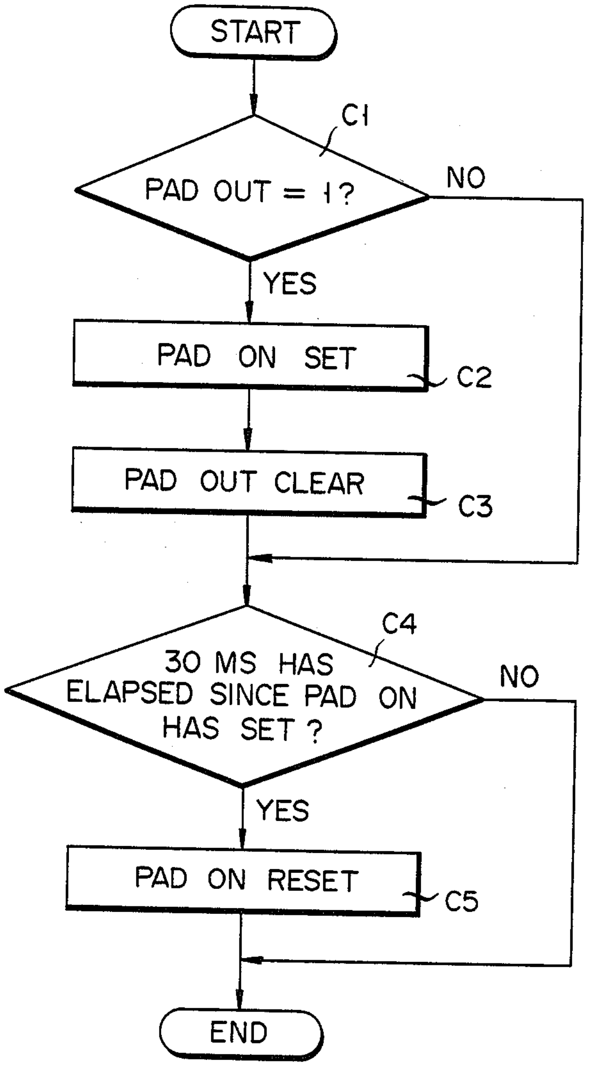
FIG. 6 is a flow chart showing a chattering process as an operation of the first embodiment.

When pad key 16 is depressed during the second time, as shown in FIG. 9(B), a low-level interruption-detection signal is fed to interruption-detection circuit 31. CPU 40 determines that this signal is given as shown in FIG. 5 (step B1), and presets pad-on/off data of "1000" indicating that pad switch 16 among pad switches 16 to 19 is preset in PAD 1 of pad-on/off register 25 (step B2). At this time, PAD 2 and PAD 3 remain cleared, with data of "0000". CPU 40 then obtains the logical sum between "0000" of PAD 2 and "0000" of PAD 3 for the individual bits, then executes the exclusive OR operation for the resultant OR data and the data of PAD 1 for the individual bits, then the logical product of the exclusive OR data and the data of PAD 1 for the individual bits, and presets the resultant data in PAD 3 (step B3). In the resultant data, only when bit corresponding to "1", "0", and "0" in PAD 1, PAD 2, and PAD 3, is "1" before the stop B2. In the instant case, data "1000" is obtained. If there is "1" in PAD 2, and in PAD 3, the operation is excluded, for it is not a real pad key-on operation. In this way, accurate judgement, as to whether a pad key-on operation has been performed, can be made.

CPU 40 then takes the logical sum of data "1000" of PAD 3 and pad key-on data PAD ON "0000" from chattering-removal flag register 37, in the instant case, for the individual bits, and execute the ex-OR operation of the resultant OR data and the pad key-on data "0000" (noted above) for the individual bits, to preset the resultant data in the pad 3 register (step B4). It should be noted that with respect to the bit corresponding to the pad key-on data of "0", with the lapse of chattering time, only the bit corresponding to "1" of PAD 3 becomes "1", when a new pad key-on operation is performed. In this case, data "1000" is obtained as a result of the chattering-removal process.

CPU 40 determines that a true pad key-on operation has been performed, from the fact that the first bit in PAD 3 is "1" (step B5), and reads out timbre data of bass drum of PCMA, corresponding to bit "1", from timbre register 24 and feeds it to PCM rhythm-generating unit 34 for generating pad attenuating sound (step B6).

In the above way, even during melody playing, it is possible to cause rhythm sounds to be produced in a pattern desired by the performer.

Then, CPU 40 sets a pad-sounding flag in working register 33 and transfers pad key-on/off data of "1000", in PAD 3 of pad key on-off register 25 (steps B7 and B8), to pad output register 32, and then it shifts pad key-on/off data in PAD 2 to PAD 3, and pad key-on/off data in PAD 1 to PAD 2 (step B9).

Subsequently, CPU 40 effects a check, every 2 msec, as to whether the interruption signal detected by interruption-detection circuit 31 is low. If the interruption signal is not low, CPU 40 shifts pad key-on/off data in PAD 2 of pad key-on/off register 25, to PAD 3, and pad key-on/off data in PAD 1, to PAD 2, and presets pad key-on/off data of "0000" in PAD 1 (step B10).

Chattering Process

Since the first bit of pad output register (PAD OUT) 32 is set to "1" in step B8, CPU 40 judges that a pad key-on operation (step C1) has been performed, and then it sets chattering-removal flag register (PAD ON) 37 and clears pad output register (PAD OUT) 32 (steps C2 and C3). Then, after a lapse of 30 msec. from the setting of chattering-removal flag register (PAD ON) 37, CPU 40 clears chattering-removal flag register (PAD ON) 37 (steps C4 and C5). CPU 40 thus executes step B4 of the chattering-removal process, shown in FIG. 5, and the same pad attenuating sound is not produced for 30 mesc. by a pad key-on operation.

Overall Process and Automatic Rhythm Play/Accompaniment Control Process

Figure 7:
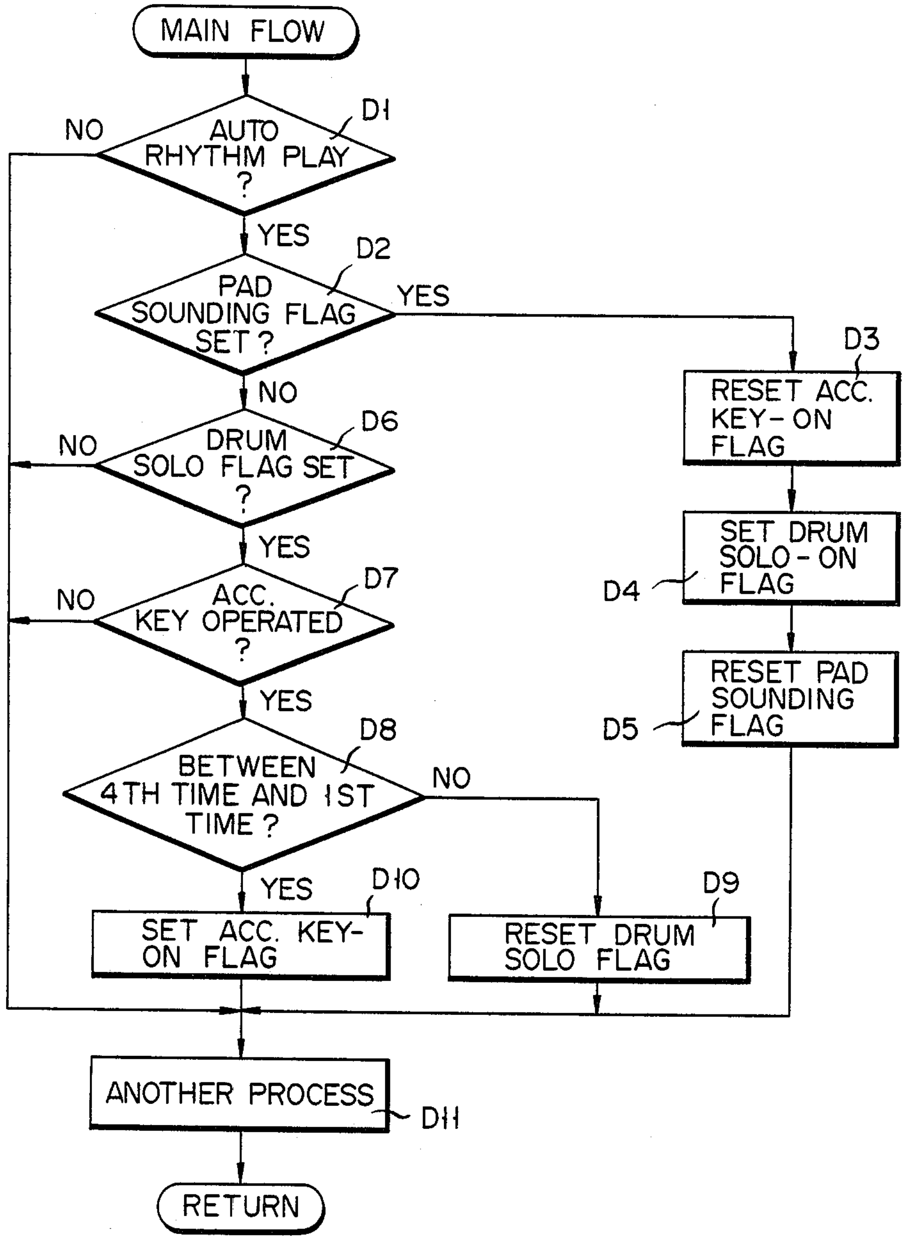
FIG. 7 is a flow chart showing the overall operation of the first embodiment.

FIG. 7 shows the main flow of the operation of the instrument. In this flow, the other processes in step D11 include the pad timbre-setting process, shown in FIG. 4, the pad key-on detection process, shown in FIG. 5, the chattering-removal process, shown in FIG. 6, and the automatic rhythm play control process, shown in FIG. 8.

After each of the above processes has been performed, CPU 40 determines that automatic rhythm play is in operation, since rhythm start/stop key 10 is "on" (step D1). Since it is detected, in step B7, that a pad-sounding flag is set in working register 33, it determines that a pad key-on operation has been performed (step D2). Thus, CPU 40 clears the accompaniment key-on flag in working register 33 (step D3), sets a drum solo flag, as shown in FIG. 9(C) (step D4), and clears the pad-sounding flag (step D5). In the above way, an initialization process for interrupting the automatic rhythm play is executed.

Figure 8:
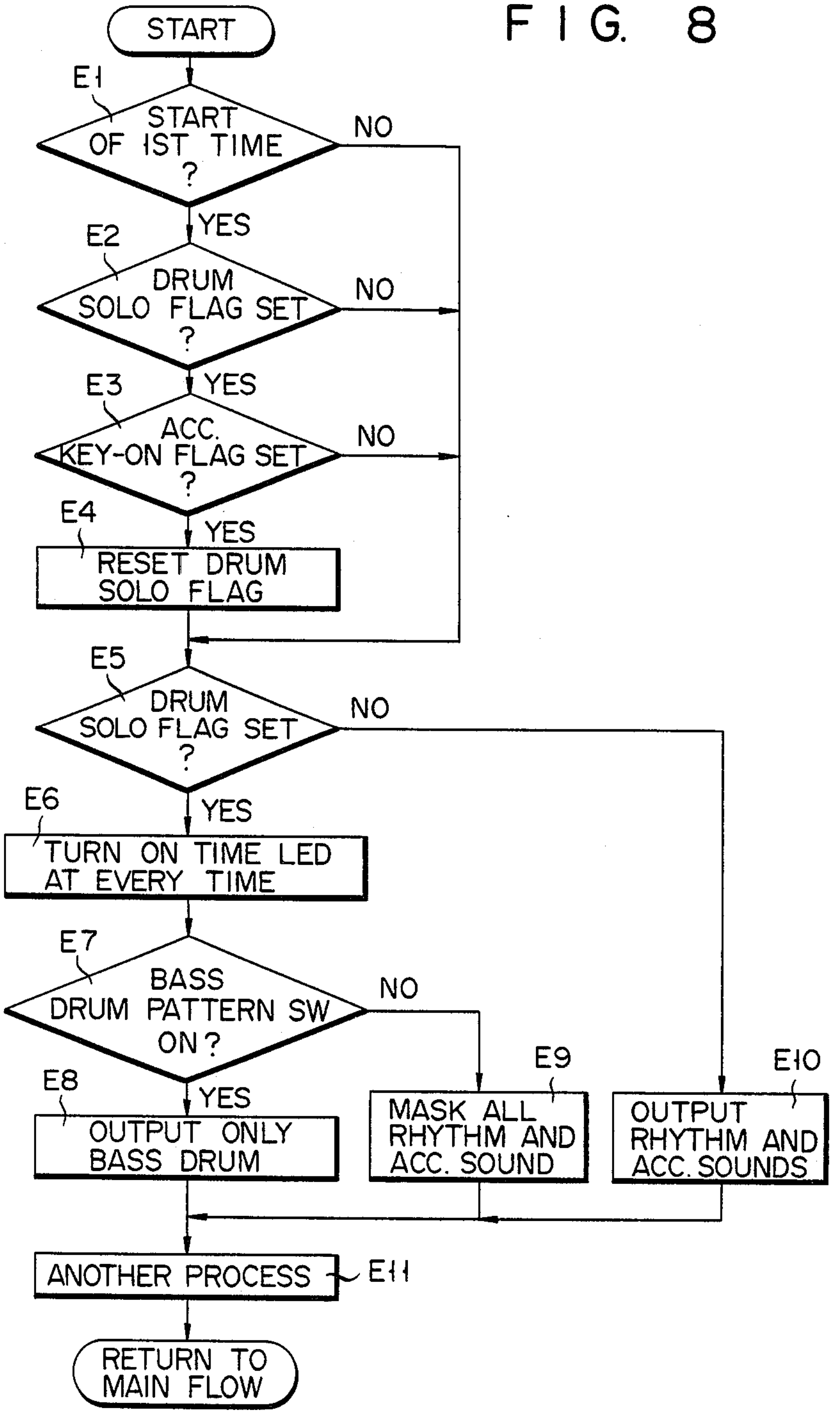
FIG. 8 is a flow chart showing a process for control of automatic rhythm play and accompaniment play in the first embodiment.
Figure 9:
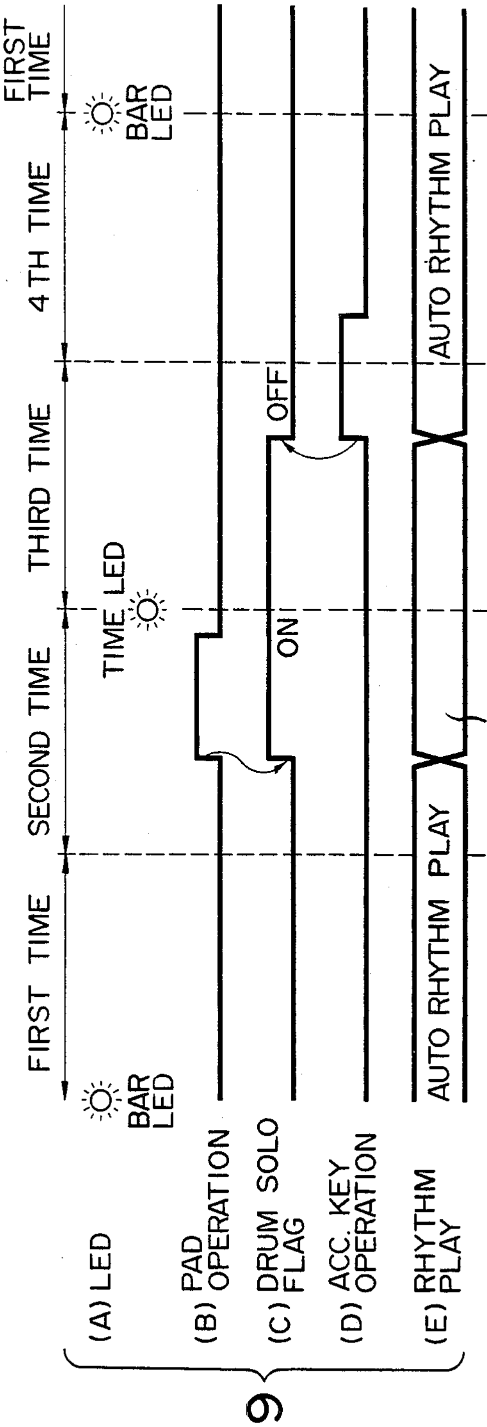
FIG. 9 is a timing chart showing an operation of the first embodiment, particularly when an accompaniment key is operated in the third time.
Figure 10:
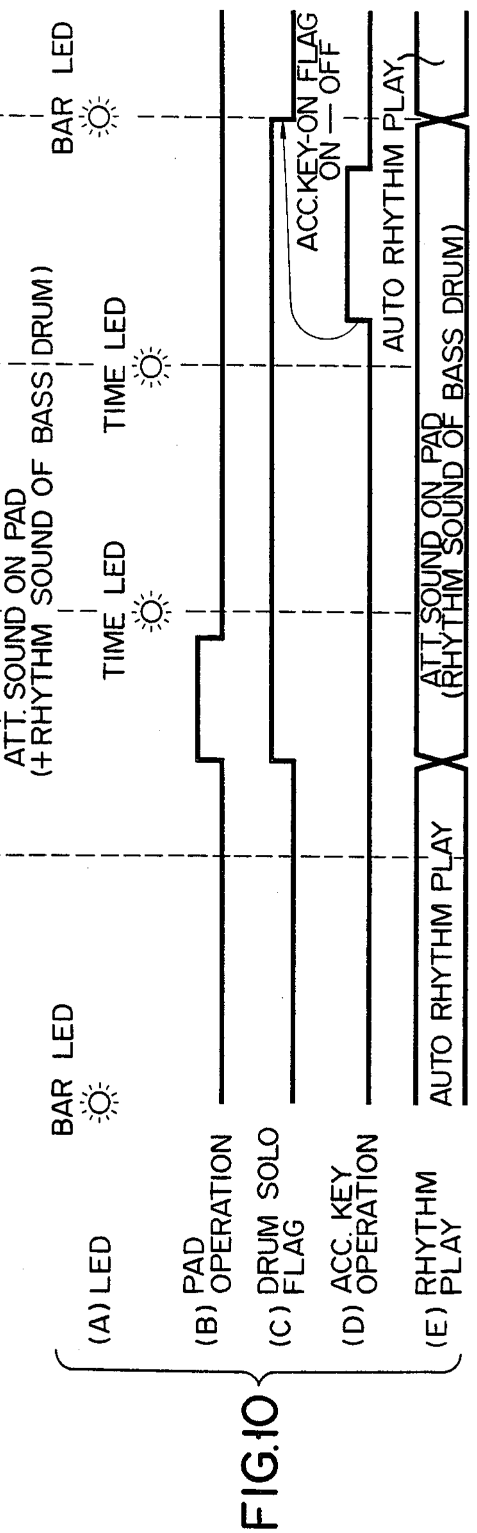
FIG. 10 is a timing chart showing an operation when an accompaniment key is operated in the fourth time.

CPU 40 executes a judgement as to whether it is not the start of first time at present on the basis of the flow of the automatic rhythm play control, as shown in FIG. 8, which is started for every predetermined duration, e.g., time (step E1). Since it is found, in step D4, that the drum solo flag is set, CPU 40 determines that the automatic rhythm play has to be interrupted (step E5), and it turns on time LED 21 at the start of each time.

In this way, after a pad key has been turned on, the tempo of music being played is shown, as time LED 21 is turned on, as is shown in FIG. 9(A). With this tempo display as a guide, the desired rhythm can be produced in conformity to the displayed tempo, by operating pad keys 16 to 19.

Then, since rhythm pattern key 11 is "on", CPU 40 determines that bass drum has to be sounded concurrently with the sounding of the pad attenuating tone (step E7). Then, it causes the sounding of the bass drum only, as is shown in FIG. 9(E) (step E8), and then executes another process (step E11). The routine then returns to the main flow.

Thus, in this case, it is detected that bass drum pattern key 11 is "on", and the bass drum sound, which represents the most basic rhythm, is continually provided, even during rhythm play, based on the pad attenuating sound. It is thus possible to make the rhythm play, based on the pad attenuating sound, more rich musically and capable of being more easily provided.

If, in this case, it is detected that bass drum pattern key 11 if "off" (step E7), the rhythm sound of the bass drum also is not produced. That is, both the rhythm sound and accompaniment sound are perfectly muted, in step E9. In other words, the automatic rhythm play and accompaniment are completely interrupted, as is shown in FIG. 9(E).

Thus, during manual rhythm play based on pad attenuating sounds, the automatic rhythm play or corresponding automatic accompaniment or ordinary accompaniment is automatically held interrupted, so that the rhythm play based on pad key operation is pronounced. In this embodiment, no key operation is necessary for stopping the automatic rhythm play.

When a key on accompaniment keyboard 1 is turned on during the third time, as is shown in FIG. 9(D), CPU 40 judges that automatic rhythm play is in operation, and that a pad-sounding flag and a drum solo flag have been set (steps D1 to D3). CPU 40 then determines that the present time is the third one and not the last, i.e., the fourth time (step D8), and it clears the drum solo flag and releases the automatic rhythm play-interruption state (step D9).

On the basis of this, CPU 40 executes a process shown in the flow of FIG. 8 at the start of the next time. By determining that it is not the start of the first time (step E1), CPU 40 determines that it is necessary to clear the drum solo flag, and restarts the automatic rhythm play and accompaniment (step E10).

Thus, as is shown in FIG. 9(E), the automatic rhythm play and accompaniment, which have been held interrupted or continued only with the bass drum, can be restarted in the preset status. It is thus possible to effect operation of the accompaniment key, for accompaniment, and the operation for restarting the automatic rhythm play on a time, that is, no particular key or operation thereof is necessary for restarting the automatic rhythm play.

Further, when an accompaniment key is turned on during the last, i.e., fourth time, as is shown in FIG. 10(D), after a pad key-on operation in the second time, as is shown in FIG. 9(B), CPU 40 judges, in step D8, that it is between the fourth time and the first time of the next bar. This time, CPU 40 first sets an accompaniment key-on flag in working register 33 (step D10). When the start of the first time of the next bar is detected (step E1), CPU 40 determines that both the drum solo flag and accompaniment key-on flag have been set (steps E2 and E3). Then it clears the drum solo flag (step E4) and restarts the automatic rhythm play and accompaniment (step E10).

When an accompaniment key is turned on during the last, i.e., fourth time, as is shown in FIG. 10(D), the automatic rhythm play and accompaniment are restarted at the start of the next bar. The content of the rhythm play can thus be automatically changed instantly between bars, this point in time being desirable from the standpoint of a musical performance. Further, when restarting the automatic rhythm play at the start of a bar, it is possible to provide an instruction for changing the rhythm play, in advance, instead of waiting for the start of the bar.

Further, while, in the above embodiment, the pad keys used for the sounding rhythm, based on pad attenuating sounds, have been of the push-type, it is also possible to use pad keys of the striking-type.

Further, while in the above embodiment, pad keys 16 to 19 are provided in the same casing as for the keyboards, it is possible to realize a similar apparatus by providing an input device, including pad keys, externally, and electrically connecting the device to an electronic musical instrument (which need not be a keyboard-type musical instrument). Further, it is possible to mount a removable pad key section on the keyboard.

Further, the operation for restarting the interrupted automatic rhythm play and accompaniment, during manual rhythm play, is not limited to the accompaniment keyboard, but it may be performed by using one or more keys of the melody keyboard or other keys or switches.

Further, the time LED may be replaced by a liquid crystal display element or the like for displaying the time order numbers: "1", "2", . . . .

As has been shown in the above embodiment, manually operable instruction means are provided for commanding the sounding of percussion instruments, by means of a switching key operation. Thus, it is possible to achieve the rhythm play desired by the performer, by providing successive instructions for producing attenuating sounds. It is thus possible to freely provide various rhythm play patterns such as intro, fill-in, break, and ending, so that the playing of music with a wide variety of variations can be obtained. Further, since that means for commanding a sounding is provided in the same casing as for the keyboards, the electronic musical instrument can be conveniently carried, and there is no need to separately transport a device for providing attenuating sounds, and it is possible to produce a playing of music with a wide variety of variations.

Further, while sounds of percussion instruments are being produced, other rhythm play or accompaniment is automatically held interrupted, so that the percussion instrument sounds remain prominent. Further, no key operation is necessary for stopping the rhythm play or accompaniment, so that it is possible to obtain smooth uninterrupted playing.

Further, the bass drum sound (which is not limitative) may be produced continuously at a predetermined timing, to facilitate the recognition of the tempo of manual rhythm play. In this case, smoother uninterrupted playing can be obtained.

Further, since the interrupted automatic rhythm play and accompaniment are restarted by a manual rhythm play key operation, no particular key or operation thereof is necessary for restarting the rhythm play or accompaniment in a timed relation to the progress of the music. Thus, it is possible to achieve the playing of music in a more smooth and convenient manner.

Further, when and only when the operation of restarting the interrupted playing is performed during the last time of a bar, the restart is delayed until the first time of the next bar. Thus, the content of the rhythm play and accompaniment can be automatically changed instantly between bars, this being desirable from the standpoint of the musical performance. In this way, it is possible to achieve satisfactory musical performance. Further, when the content of rhythm play is changed at the start of a bar, an instruction for changing rhythm play can be given at the end of the last time, that is, there is no need to wait for the start of bar, in order to give the instruction. The playing thus becomes that much easier.

Further, a sound of a particular timbre selected from among a plurality of timbres can be generated with respect to each pad. It is thus possible to generate various sounds with a reduced number of pads, which again is convenient, from the point of view of playing music.

Further, since the timing of each time of music is displayed during manual rhythm play, the sounding of attenuating tones can be accurately carried out, while observing the displayed tempo.

(Second Embodiment)

Now, a second embodiment of the invention will be described. In this embodiment, such musical events as an intro, fill-in, break, and ending can be freely provided. Besides, keyboard play and manual rhythm play with percussion instruments can be provided concurrently by a plurality of performers. More specifically, a sounding instruction unit for rhythm play by manual operation is provided separately of a keyboard body, and sounding instruction data is transmitted from the sounding instruction unit to the keyboard body, for generation of sounds of percussion instruments or the like.

Figure 11:
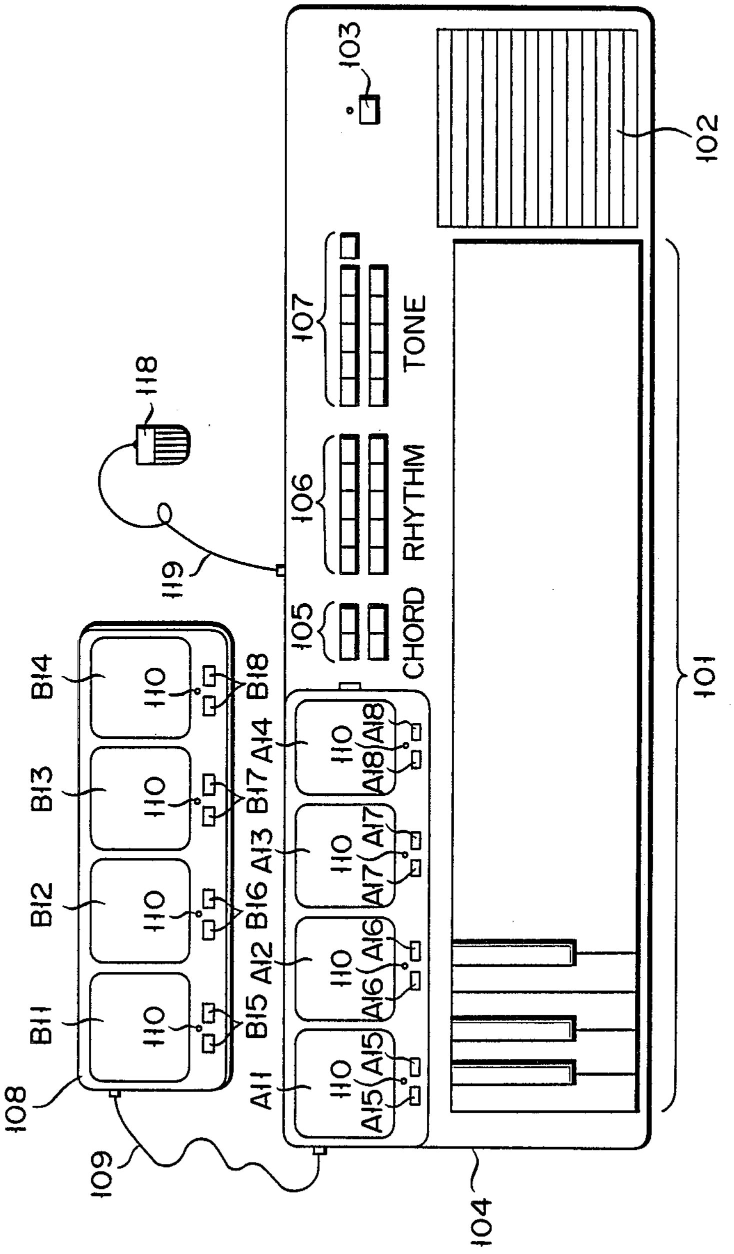
FIG. 11 is a plan view showing a second embodiment of the invention applied to an electronic keyboard musical instrument.

FIG. 11 shows a plan view of the embodiment of the electronic musical instrument. Keyboard 101 and sounding unit 102 are provided on the front portion of the electronic musical instrument. Power switch 103 is provided on the rear portion, with respect to sounding unit 102. Pad rhythm operation unit 104, chord selection key 105, rhythm selection key 106, and melody timbre selection key 107 are provided, in the mentioned order, from the left of rear portion, with respect to keyboard 101. Pad rhythm section 104 has four pad keys A11 to A14. Pad timbre selection keys A15 to A18 are provided adjacent to the front edge of respective pad keys A11 to A14. When pad keys A11 to A14 are struck, single sounds of percussion instruments or the like are produced fom sounding unit 102. Pad timbre selection keys A15 to A18 serve to switch the timbre of pad key sounds to bass drum, low bongo, etc.

Chord selection key 105 serves to switch modes to a one-finger mode, in which chord accompaniment play of keyboard 101 is provided automatically with one finger, a finger mode, in which a melody is provided automatically with chords, and a normal mode, in which ordinary melody play is provided. Rhythm selection key 106 serves to switch the content of automatic rhythm play to rock, disco, etc. Melody timbre selection key 107 serves to selectively designate the timbre, such as piano and guitar, of melody tones played on keyboard 101.

Pad rhythm operation unit 108 is electrically connected through cable 109 to the electronic musical instrument body. The unit has pad keys B11 to B14 and pad timbre selection keys B15 to B18. When pad keys B11 to B14 are struck, single sounds of percussion instruments or the like are provided from sounding unit 102. Foot key 118, which is operated by the operator's foot, is electrically connected through cable 119 to the electronic musical instrument body. When the foot key is depressed, a single bass drum sound is produced from sounding unit 102.

Of the pad keys in pad rhythm section 104 and pad rhythm operation unit 108, the same pad timbre is set in keys A11 and B11, A12 and B12, A13 and B13, and A14 and B14. Of pad timbre selection keys A15 and B15, A16 and B16, A17 and B17, and A18 and B18, the timbre of one which is operated later is preset. Light-emitting diodes 110 are provided on each of pad timbre selection keys A15 to A18 and B15 to B18. Light-emitting diode 110, corresponding to the one of the pair pad timbre selection keys that is operated later, is turned on to display the prevailing preset timbre.

Figure 12:
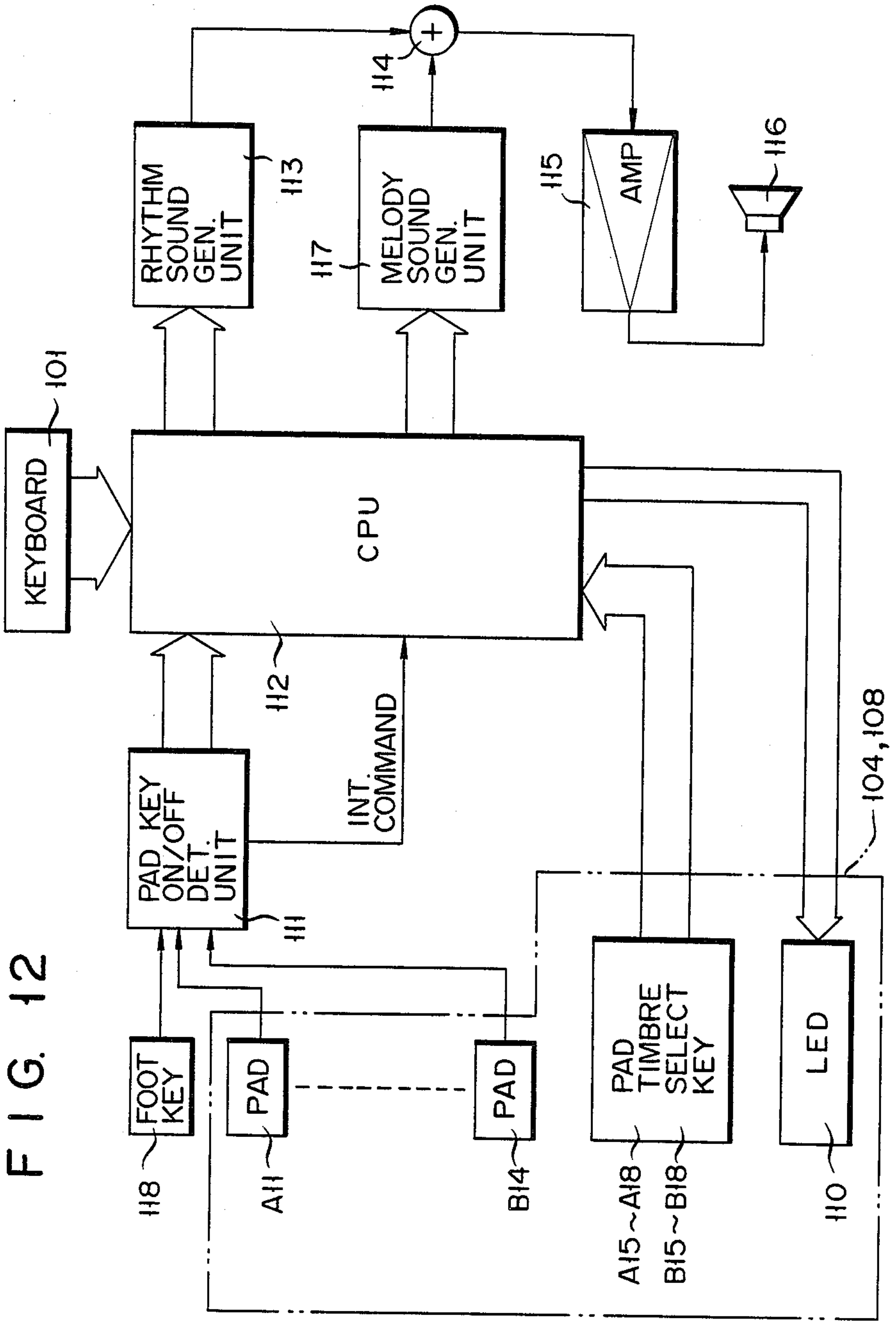
FIG. 12 is a block diagram showing the circuitry of the second embodiment.

The operation of striking pad keys A11 to A14 and B11 to B14 is detected by pad key on/off detection unit 111 as shown in FIG. 12. The output of unit 111 is fed to CPU 112 and thence fed, together with timbre data designated by pad timbre selection keys A15 to A18 and B15 to B18, to rhythm sound generation unit 113. Thus, a single attenuating sound signal of a percussion instrument, such as a brass drum or a snare drum, is generated from rhythm sound generation unit 113 and fed through mixer 114 and amplifier 115 to loudspeaker 116. Thus, a rhythm sound is produced from loudspeaker 116 according to the attenuating sound signal. Pad key-on/off detection unit 111 and CPU 112 have the same construction as those in the first embodiment, so their detailed description is omitted. CPU 112 detects operation of pad timbre selection keys A15 to A18 and B15 to B18, and turns on corresponding light-emitting diodes 110. Also, when an operation of striking pad keys A11 to A14, and B11 to B14, and foot key 118 is detected by pad key-on/off detection unit 111, an interruption command is given to CPU 112, so that a process of producing pad attenuating sound is executed with priority. CPU 112 also detects the operation of keyboard 101 and feeds the corresponding note data to melody sound generation unit 117. Melody sound generation unit 117 generates a melody sound signal to be mixed with the attenuating sound signal, noted above, in mixer 114, the output of which is fed through amplifier 115 to loudspeaker 116, to be sounded.

To provide keyboard play and attenuating sound play concurrently, power switch 103 is turned on, and pad rhythm operation unit 108 and foot key 118 are connected through respective cables 109 and 119 to the electronic musical instrument body. Pad timbre selection keys B15 to B18 and pad timbre selection keys A15 to A18, on the instrument body site, designate the timbre of pad keys B11 to B14 of pad rhythm operation unit 108.

In this state, the performer at the pad rhythm operation unit side, can strike pad keys B11 to B14 and push foot key 118, with his foot, in a timed relation to the progress of music. "On" signals from pad keys B11 to B14 and from foot key 118 are fed, together with timbre data of pad timbre selection keys B15 to B18 through cable 109, to the instrument body, to produce attenuating sounds of rhythm. Melody sounds are produced as the performer at the instrument body operates keyboard 101. Attenuating sounds of rhythm are similarly produced as pad keys A11 to A14 of pad rhythm operation unit 104 are struck by the performer.

In this way, one performer may provide keyboard play, with the electronic musical instrument body, while another performer may provide rhythm play, with pad rhythm operation unit 108 and foot key 118. It is also possible for the performer at the instrument body to operate foot key 118.

Figure 13:
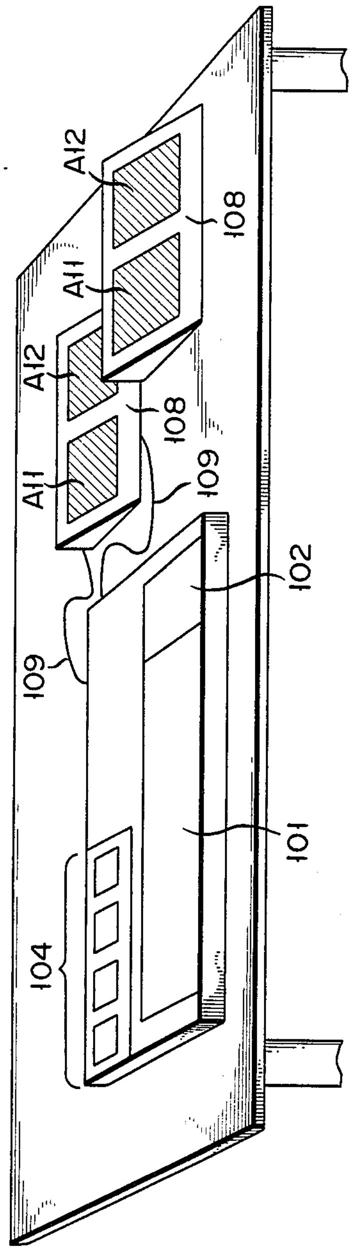
FIG. 13 is a perspective view showing a modification of the second embodiment.

In the above embodiment, only a single pad rhythm operation unit 108 is connected to the electronic musical instrument body. However, it is possible to connect a plurality of pad rhythm operation units, as is shown in FIG. 13. The electronic musical instrument body shown in FIG. 13 is the same as that shown in FIG. 11. Each pad rhythm operation unit 108, however, has substantially the same construction as foot key 118, and has pad switches A11 and A12. Thus, it can provide rhythm sounds of two different timbres. These units 108 are connected, through respective cables 109, to the electronic musical instrument body. Units 108 and the electronic musical instrument body are provided on a table.

The embodiment of FIG. 13 permits increased freedom in the manner of play; for example, playing while standing, and playing while dancing.

While, in the above embodiment, pad keys A11 to A14 and B11 to B14 have been of the striking type, it is also possible to provide pad keys of the push type. Further, it is possible to detect the speed at or force with which a key is struck and to correspondingly control the volume of attenuating sound. In general, any arrangement may be provided, so long as it is capable of a switching operation. Further, pad rhythm section 104 may be one which can be removably mounted in the electronic musical instrument body. Further, a pad rhythm operation unit may be connected to an electronic musical instrument body, with pad rhythm section 104 in lieu of pad rhythm operation unit 108.

More generally, any arrangement may be connected, so long as it can instruct the generation of attenuating sounds. Further, the electronic musical instrument body and pad rhythm operation unit 108 may be connected together by any means including electric means, infrared rays, laser beams and other light, supersonic waves, radio, etc. Further, rhythm sounds of different timbres may be provided from pad rhythm section 104 and operation unit 108.

As has been shown in the above embodiment, means for generating attenuating sounds of percussion instruments or the like, in response to a switching operation, is provided. Thus, rhythm play, desired by the perfomer, can be obtained by merely giving successive instructions for generation of attenuating sounds, and various rhythm patterns such as intro, fill-in, break, and ending may be freely obtained. It is thus possible to play music with a variety of variations. Further, sounding instruction means, for generating attenuating sounds of percussion instruments or the like, is provided separately of the keyboard body, and sounding instruction data from the sounding instruction means is transmitted to the keyboard body, to generate attenuating sounds. Thus, keyboard play and attenuating sound generation play may be provided by separate persons, so it is possible to achieve the playing of music with a greater variety of variations. Further, attenuating sound generation means, provided for the sounding instruction means of the electronic musical instrument body, may also be used for externally-connected sounding instruction means.

(Third Embodiment)

A third embodiment of the invention will now be described. In this embodiment, the rhythm sound generator with pad unit, as in the previous first and second embodiments, is improved for the benefit of beginners.

The beginner, or a person having poor sense of rhythm, usually produces rhythm under navigation by tempo display LED. However, such a person can rarely satisfactorily produce a predetermined rhythm pattern by such an indirect method. Also, even for a person who can play music quite satisfactorily, it is not easy to produce a complicated and high-tempo rhythm pattern while watching a score.

Further, with an electronic musical instrument which does not have any tempo display, it takes a considerable amount of time until an unfamiliar rhythm pattern is mastered by training, so that it is difficult, during the familiarisation period, to fully enjoy the playing of music.

This embodiment seeks to provide improvement in this connection, and it is an electronic musical instrument, which can assist rhythm play and permits ready mastering of rhythm play techniques. More specifically, display means are provided in correspondence to pad keys and driven in an interlocked relation to rhythm pattern generation means to display a rhythm pattern, thus providing navigation.

Figure 14:
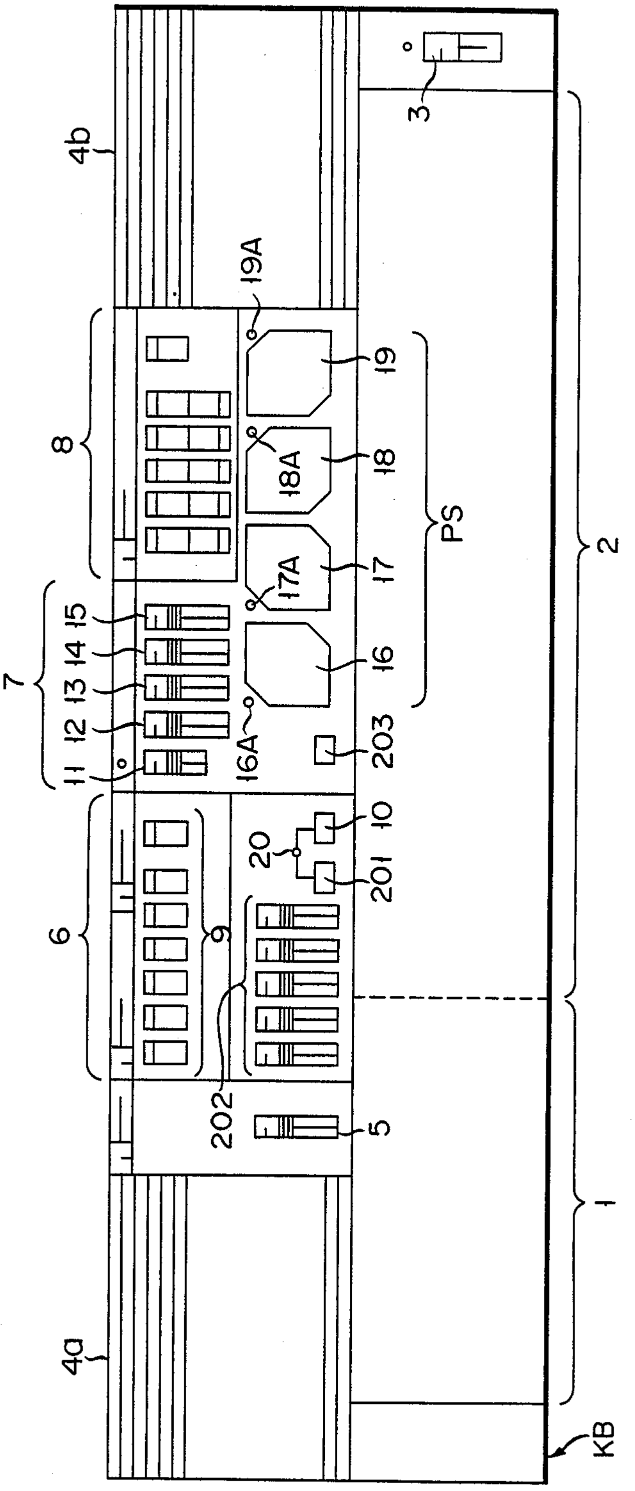
FIG. 14 is a plan view showing a third embodiment of the invention applied to an electronic keyboard musical instrument.

The specific constitution of the embodiment will now be described. FIG. 14 is a plan view showing an electronic keyboard musical instrument. The instrument has substantially the same shape as described before in connection with the first embodiment. For the sake of simplicity, like parts are designated by like reference numerals without giving their description, and only a different part will be described.

Reference numeral 201 designates synchrostart key. When this key is depressed, a synchrostart ready state is provided, and a rhythm is started at the instant of operation of lower two-octave accompaniment keyboard 1.

Reference numeral 202 designates a key switch called super-rhythm key, which permits a large number of variations to be obtained by changing various sound source patterns such as brass drum, snare drum, closed highhat, etc. and also chord and bass patterns.

Figure 15:
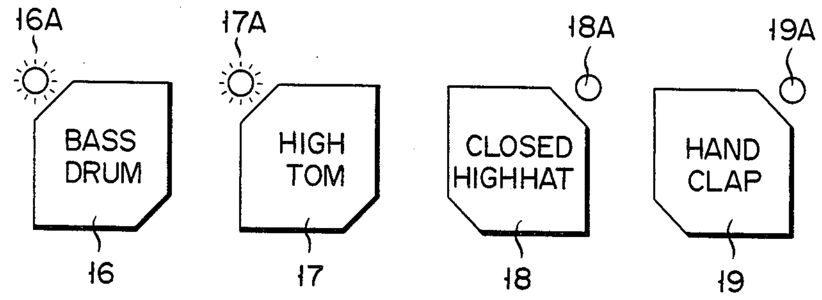
FIG. 15 is a view, to an enlarged-scale, showing a manual operating section of the third embodiment.

LEDs 16A to 19A are provided adjacent to the left top of pad keys 16 to 19 provided in pad rhythm operation unit 7, as shown in FIG. 15. Reference numeral 203 designates navigate switch. When navigate switch 203 is switched to START position, an internal automatic rhythm pattern generation unit is started. LEDs 16A to 19A indicate, when they are turned on, the pad key to be depressed by the preformer and the timing of depression in accordance with a predetermined pattern.

The circuit construction of the embodiment will now be described with reference to FIG. 16.

Pad key on/off detection unit 204 detects operation of pad keys 16 to 19 and feeds the detection signal to CPU 205. CPU 205 feeds this signal together with timbre data designated by pad timbre selection keys 12 to 15 to rhythm sound generation unit 206. Unit 206 thus generates a single attenuating sound signal of a percussion instrument or the like, e.g., bass drum or snare drum, through mixer 207 and amplifier 208 to loudspeaker 209, so that a rhythm sound is generated according to the attenuating sound signal. Pad key on/off detection unit 204 and CPU 205 have substantially the same construction as those in the first embodiment, so their detailed description is omitted. In this case, when pad key-on/off detection unit 204 detects operation of pad keys 16 to 19, it feeds an interruption command to CPU 205, so that a process of producing a pad attenuation sound is executed with priority. Further, CPU 205 detects operation of accompaniment keyboard 1 and melody keyboard 2 and feeds corresponding note data to melody sound generation unit 210. Unit 210 thus generates a melody sound signal which is mixed with attenuating sound signal from rhythm sound generation unit 206 in mixer 207, the output of which is fed through amplifier 208 to loudspeaker 209 for sounding. In automatic rhythm pattern generation unit 211, in response to operation of navigate switch 203 rhythm pattern data is read out by CPU 205 to be fed to display unit 212 consisting of LEDs 16A to 19A. Thus, corresponding LEDs 16A to 19A are turned on in a timed relation to a rhythm pattern.

Figure 17:
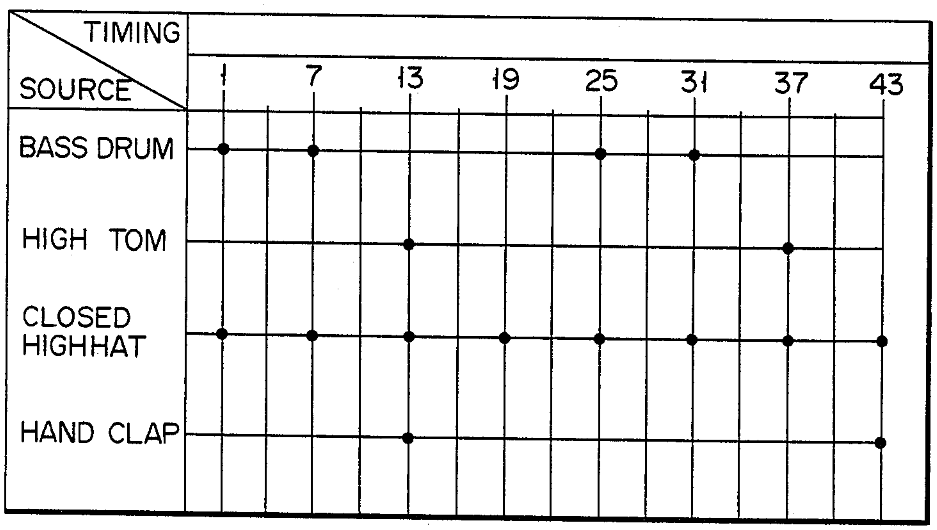
FIG. 17 is a view showing a rock-rhythm pattern.

Now, the function of navigate switch 203 will be described with reference to FIG. 15, which shows pad keys 16 to 19 and corresponding LEDs 16A to 19A, and also FIG. 17, which shows a rhythm pattern of rock as the basic rhythm.

When navigate key 203 is turned on, CPU 205 releases the previous designation by pad timbre selection keys 12 to 15 and allots percussion instruments necessary for the generation of the basic rhythm stored in automatic rhythm pattern generation unit 211 to pad keys 16 to 19. Taking the rhythm of rock shown in FIG. 17 as an example, since the percussion instruments used in this case are bass drum, high tom, closed highhat, and handclap, the bass drum is allotted to pad key 16, high tom to pad key 17, closed highhat to pad switch 18, and handclap to pad key 19. Then, CPU 205 turns on the LED corresponding to each pad key according to the rhythm pattern of rock from automatic rhythm pattern generation unit 211. More specifically, LEDs 16A and 18A are turned on at timings No. 1 and No. 7, LEDs 17A to 19A at timing No. 13, LED 18A at timing No. 19, LEDs 16A and 18A at timings of No. 25 and No. 31, LEDs 17A and 18A at timing of No. 37, and LEDs 18A and 19A at timing No. 43 according to large black dots shown in FIG. 17. Subsequently, LEDs 16A and 17A are turned on at timing No. 1 again (as shown in FIG. 15), and the light emission step described above is repeated.

The performer can recognize the rhythm pattern of rock in advance by the order and tempo of light emission from LEDs. Thus, as the performer strikes pad keys corresponding to "on" LEDs at the timing of light emission, percussion instrument sound signals allotted to pad keys are produced in rhythm sound generation unit 206 and sounded through mixer 207, amplifier 208 and loudspeaker 209. Thus, accurate rhythm play can be obtained by striking pad keys corresponding to LEDs which are successively turned on.

While some preferred embodiments of the invention have been described above, they are by no means limit, and it will be obvious to a person having ordinary knowledge that various changes and modifications can be made without departing from the spirit and scope of the invention.

Figure 16:
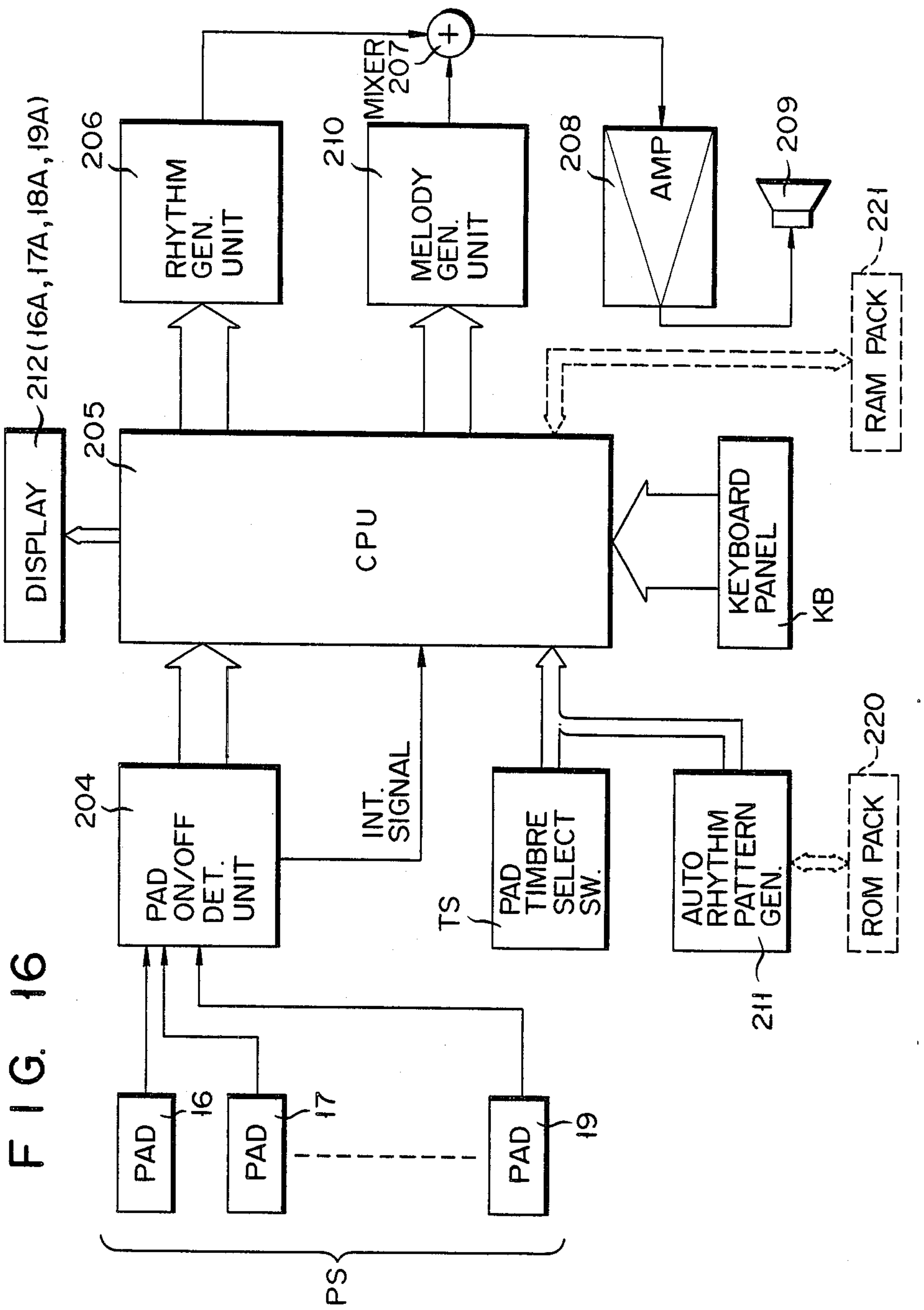
FIG. 16 is a block diagram showing the circuitry of the third embodiment.

For example, it is possible to permit other rhythm patterns than those in the instrument body to be mastered by utilizing an external memory acting as the memory of the automatic rhythm pattern generation unit, i.e., by permitting rhythm patterns, which exist infinitely in music, to be obtained from an external memory such as ROM pack 220 or a ROM card as shown by dashed lines in FIG. 16. Also, a rhythm pattern which is composed by the performer himself from pads may be stored in RAM pack 221 as shown by dashed line in FIG. 16 by providing a pattern recorder, so that other persons may train with that pattern. Further, LEDs having the navigation function as noted above may be provided in an external pad unit connected to the electronic musical instrument to permit one performer to play melody and another performer concurrently play rhythm with the external pad. The system of supplying a rhythm pattern from external ROM pack 220 or ROM card as noted above can be effectively utilized for newly arising kinds of music without alteration of the available musical instruments.

Further, by causing rhythm sounds other than the bass drum to be produced at respective timings while causing LEDs with respect to the bass drum only to be turned on, a play guide, i.e., navigation function, is provided only for the bass drum. In general, it is possible to provide navigation only for rhythm sounds of a particular timbre while permitting rhythm sounds of the other timbres to be automatically produced.

As has been described in the foregoing, according to the invention a guide of a rhythm pattern in rhythm play, i.e., keys to be operated and a navigation function showing the timing of key operation, is provided. Thus, the rhythm play does not constitute any substantial burden in the training of the beginner and actual play by the skilled performer, so that music can be quickly mastered and played with enjoyment.

It is to be understood that according to the invention a musical instrument and percussion instruments are musically related to one another, so that it is possible to play music which could not have been easily performed heretofore. Besides, percussion instrument sounds can be produced every time the corresponding pad is operated, so that convenient manual rhythm play can be performed. Further, it is possible to permit rhythm pattern training by the performer by the provision of a navigation function or an external memory, which is desired in view of a musical education.

What is claimed is:

1. An electronic keyboard musical instrument capable of manual rhythm play, comprising:

- a keyboard having a plurality of keys for instructing the generation of a note signal when a corresponding key is operated;
- note signal generating means for generating a note signal according to a note signal generation instruction from said keyboard;
- manually operable operating means provided in a casing with said keyboard provided thereon, said operating means being discrete from said keyboard and including a plurality of pad keys;
- control means for detecting the operation of said operating means and instructing the generation of a rhythm sound when operation of one of the plurality of pad keys is detected;
- automatic rhythm play means for instructing an automatic generation of a rhythm sound according to a kind of a preliminary designated rhythm; and
- rhythm sound signal generating means for generating a rhythm sound signal according to an instruction of both said control means and said automatic rhythm play means;
- wherein said automatic rhythm play means includes means for stopping the generation of rhythm sounds in at least part of an automatic rhythm play in response to an operation of the one pad key of said manually operable operating means.

2. An electronic keyboard musical instrument according to claim 1, wherein said plurality of pad keys are on/off switches, and wherein on/off signals from said on/off switches are fed to a CPU provided in said control means.

3. An electronic keyboard musical instrument according to claim 2, wherein said CPU includes timbre register means for storing timbre designation data designating timbres preliminarily allotted to said pad keys.

4. An electronic keyboard musical instrument according to claim 1, wherein said means for stopping stops the generation of said rhythm sounds of the automatic rhythm play being previously provided by said automatic rhythm play means, except for a particular rhythm sound, in response to an operation of said manually operable operating means.

5. An electronic keyboard musical instrument according to claim 1, wherein said automatic rhythm play means includes means for stopping the generation of rhythm sounds of an automatic rhythm play being previously provided by said automatic rhythm play means except for a particular rhythm sound in response to an operation of said manually operable operating means.

6. An electronic keyboard musical instrument according to claim 5, wherein said particular rhythm sound is a basic rhythm of the automatic rhythm play.

7. An electronic keyboard musical instrument according to claim 6, wherein said particular rhythm sound is a bass drum sound.

8. An electronic keyboard musical instrument according to claim 1, which further comprises automatic accompaniment means for automatically generating accompaniment sounds according to a preliminarily designated accompaniment pattern, the generation of accompaniment sounds in at least part of an automatic accompaniment provided by said automatic accompaniment means being stopped in response to an operation of the one pad key of said manually operable operating means.

9. An electronic keyboard musical instrument according to claim 8, which further comprises means for entirely stopping the generation of accompaniment sounds provided by said automatic accompaniment means in response to an operation of said manually operable operating means.

10. An electronic keyboard musical instrument according to claim 1, wherein said automatic rhythm play means includes restarting means for restarting, in response to operation of at least some key on said keyboard, the generation of rhythm sounds of at least part of an automatic rhythm play having been interrupted by an operation of the one pad key of said manually operable operating means.

11. An electronic keyboard musical instrument according to claim 10, wherein said restarting means restarts said automatic rhythm play in response to operation of an accompaniment key on said keyboard.

12. An electronic keyboard musical instrument according to claim 8, wherein said automatic accompaniment means restarts, in response to operation of at least some key on said keyboard, the generation of accompaniment sounds of at least part of an automatic accompaniment having been interrupted by an operation of said manually operable operating means.

13. An electronic keyboard musical instrument according to claim 12, wherein said restarting means restarts an automatic accompaniment in response to operation of an accompaniment key on said keyboard.

14. An electronic keyboard musical instrument according to claim 10, wherein when at least some key on said keyboard is operated during a period between the start of the last time of a bar and the start of the next bar, said restarting means restarts said rhythm sound generation from the instant of the start of said next bar.

15. An electronic keyboard musical instrument according to claim 12, wherein at least some key on said keyboard is operated during a period between the start of the last time of a bar and the start of the next bar, said restarting means restarts said accompaniment sound generation from the instant of the start of said next bar.

16. An electronic keyboard musical instrument according to claim 1, which further comprises timbre selection designation means coupled to said control means for selectively designating the timbre of rhythm sound generated by the one pad key of said manually operable operating means.

17. An electronic keyboard musical instrument according to claim 1, which further comprises tempo display means coupled to said control means and controlled such as to display the tempo for each time after operation of said manually operable operating means.

18. An electronic keyboard musical instrument according to claim 1, which further comprises a coupling means for coupling the instrument to external operating means capable of manual operation, operation signal obtained from said external operating means with an operation thereof being supplied to said control means so that a designated rhythm sound signal is provided from said rhythm sound signal generating means.

19. An electronic keyboard musical instrument according to claim 18, which is coupled to said external operating means through signal transmission means and receives an indication signal indicative of an operated one of a plurality of operating elements provided in said external operating means.

20. An electronic keyboard musical instrument according to claim 1, which further comprises display means provided in correspondence to said manually operable operating means, said disply means being driven according to a rhythm pattern provided from rhythm pattern generating means to display the timing of operation of said manually operable operating means.

21. An electronic keyboard musical instrument according to claim 20, wherein said rhythm pattern generating means generates a rhythm pattern supplied from external memory means.

22. An electronic keyboard musical instrument according to claim 20, wherein said rhythm pattern generating means includes memory means for storing a rhythm pattern preliminarily input by a performer, said display means being driven by the output from said memory means.

23. An electronic keyboard musical instrument according to claim 20, wherein said display means being provided for each of said pad keys and displaying key operation timing according to a rhythm pattern generated from said rhythm pattern generating means.

24. An electronic keyboard musical instrument according to claim 18, wherein said external operating means includes first timbre selection means for setting a timbre with respect to a designated rhythm sound.

25. An electronic keyboard musical instrument according to claim 24, wherein said operating means provided on said musical instrument includes second timbre selection means for setting a timbre with respect to a designated rhythm sound provided by said operating means.

26. An electronic keyboard musical instrument according to claim 25, wherein said control means includes means for effecting timbre setting according to one of said first and second timbre selection means that is last operated.

27. An electronic keyboard musical instrument comprising:

a keyboard having a plurality of keys for instructing generation of a tone in response to a corresponding one of said keys;

a central processing unit for receiving the tone generation instruction signal from said keyboard;

a plurality of pad operating means;

pad operation detection means for supplying an operation signal of said plurality of pad operating means as digital signal to said central processing unit;

tone signal generating means coupled to said central processing unit, for generating a tone signal in response to an operation of said keyboard;

sound signal generating means coupled to said central processing unit, for generating sound signals in response to operation of said plurality of pad operating means;

sounding system for receiving the output signals of said tone signal generating means and sound signal generating means and generating corresponding sounds;

at least said keyboard, said plurality of pad operating means, said central processing unit and said pad operation detection means being provided in a single casing; and automatic rhythm play means for automatically generating a rhythm sound according to a kind of a preliminarily designated rhythm and including means for stopping the generation of rhythm sounds in at least part of an automatic rhythm play in response to an operation of said pad operating means.

28. An electronic keyboard musical instrument according to claim 27, wherein said stopping means entirely stops the generation of rhythm sounds of an automatic rhythm play being previously provided by said automatic rhythm play means in response to an operation of said manually operable operating means.

29. An electronic keyboard musical instrument according to claim 27, wherein said stopping means stops the generation of rhythm sounds of an automatic rhythm play being previously provided by said automatic rhythm means, except for a particular rhythm sound, in response to an operation of said pad operating means.

* * * * *